United States Patent
ElShenawy (10) Patent No.: US 11,995,603 B2
(45) Date of Patent: May 28, 2024

(54) PEER-TO-PEER AUTONOMOUS VEHICLE DELIVERY

(71) Applicant: GM Cruise Holdings LLC, San Francisco, CA (US)

(72) Inventor: Mohamed Mostafa ElShenawy, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 491 days.

(21) Appl. No.: 16/448,343

(22) Filed: Jun. 21, 2019

(65) Prior Publication Data
US 2020/0402003 A1 Dec. 24, 2020

(51) Int. Cl.
*G06Q 10/0835* (2023.01)
*E05G 1/10* (2006.01)
*G05D 1/00* (2006.01)
*G06Q 10/0832* (2023.01)
*G06Q 10/0833* (2023.01)

(52) U.S. Cl.
CPC ......... *G06Q 10/08355* (2013.01); *E05G 1/10* (2013.01); *G05D 1/0088* (2013.01); *G06Q 10/0832* (2013.01); *G06Q 10/0833* (2013.01)

(58) Field of Classification Search
CPC ......... G06Q 10/08355; G06Q 10/0832; G06Q 10/0833; G05D 1/0088; E05G 1/10
USPC ........................ 705/332, 333, 338
See application file for complete search history.

(56) References Cited

U.S. PATENT DOCUMENTS

| | | | |
|---|---|---|---|
| 10,181,110 B1* | 1/2019 | Atkinson | G06F 40/174 |
| 10,303,171 B1 | 5/2019 | Brady et al. | |
| 11,263,579 B1* | 3/2022 | Siegel | G06Q 10/0832 |
| 11,474,530 B1* | 10/2022 | Boyraz | G05D 1/0088 |
| 2014/0136414 A1 | 5/2014 | Abhyanker | |
| 2016/0140493 A1* | 5/2016 | Dixon | G06Q 10/0833 |
| | | | 705/26.81 |
| 2018/0137593 A1* | 5/2018 | Djuric | G06Q 50/30 |
| 2018/0232788 A1* | 8/2018 | Halem | G06Q 30/06 |
| 2018/0275661 A1* | 9/2018 | Glaser | G01C 21/3423 |
| 2018/0281657 A1* | 10/2018 | Healey | G06Q 30/0241 |
| 2019/0180236 A1* | 6/2019 | Greenberger | G05D 1/0291 |
| 2020/0042019 A1* | 2/2020 | Marczuk | G08G 1/205 |
| 2020/0050211 A1* | 2/2020 | Donnelly | B60H 1/00742 |
| 2020/0241564 A1* | 7/2020 | Goldman | G06Q 50/30 |
| 2020/0272954 A1* | 8/2020 | Serra | G01C 21/3415 |
| 2020/0361356 A1* | 11/2020 | Hodge | B60N 3/103 |
| 2020/0363220 A1* | 11/2020 | Simoudis | G06Q 30/06 |
| 2020/0364688 A1* | 11/2020 | Hodge | G06Q 20/206 |

OTHER PUBLICATIONS

International Search Report and Written Opinion for International Application No. PCT/US2020/026495, dated Jul. 23, 2020, 10 pages.

* cited by examiner

Primary Examiner — Igor N Borissov (57) ABSTRACT

The present technology pertains to utilizing an autonomous transportation service to deliver items offered for sale in a peer-to-peer marketplace. The peer-to-peer marketplace can include an integration that will offer autonomous transportation and direct a buyer and seller to enter locations for pick-up and drop-off, respectively. The autonomous transportation system can transport the item from the seller to the buyer.

20 Claims, 7 Drawing Sheets

PEER-TO-PEER AUTONOMOUS VEHICLE DELIVERY

TECHNICAL FIELD

The present technology pertains to transportation of items by an autonomous vehicle, and more specifically pertains to transportation of an item sold, or for sale, by a peer-to-peer marketplace.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

A peer-to-peer marketplace includes methods of buying and selling items between people where the people involved in the transaction are not typically merchants dealing in the items sold in a peer-to-peer marketplace. Examples of common peer-to-peer marketplaces are newspaper classified ads, CRAIGSLIST, EBAY, etc. In the case of classified ads and CRAIGSLIST, the transactions are typically local, and the fulfillment of a transaction usually requires one of the parties in the transaction to travel to meet the other party.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a delivery service to be integrated with a local peer-to-peer marketplace, and in particular to utilize autonomous transportation to perform the delivery. One of the risks in participating in a peer-to-peer marketplace is having to meet an untrusted buyer or seller. Often transactions take place in a stranger's home where the visitor could be vulnerable. Also, the resident of the home is vulnerable to thieves scoping out the home. A delivery service can alleviate this disadvantage by removing the need for the parties to learn of each other's locations.

Additionally, it is common for negotiation to occur after one party (or both parties) has traveled to meet the other. These negotiations put the selling party at a disadvantage, especially when they have traveled to sell the item, because they have already taken efforts to deliver the item. Even if the effort is to adjust their schedule to be available to meet the buyer, the seller would prefer to not have to undergo this inconvenience again, and this puts them at a negotiating disadvantage. A delivery service can alleviate this disadvantage by bringing the item back to the seller with minimum inconvenience on the part of the seller.

An autonomous transportation service is better suited to the task than a manned transportation service because the drivers bring their own disadvantages. First a driver needs to pick up the item from the seller. Once again the seller finds a stranger visiting their home. Additionally, a driver isn't likely to wait around while a buyer inspects the item and determines whether they want to purchase the item or negotiate (remotely) with the seller, but an autonomous vehicle isn't laden with these drawbacks.

Figure 1:
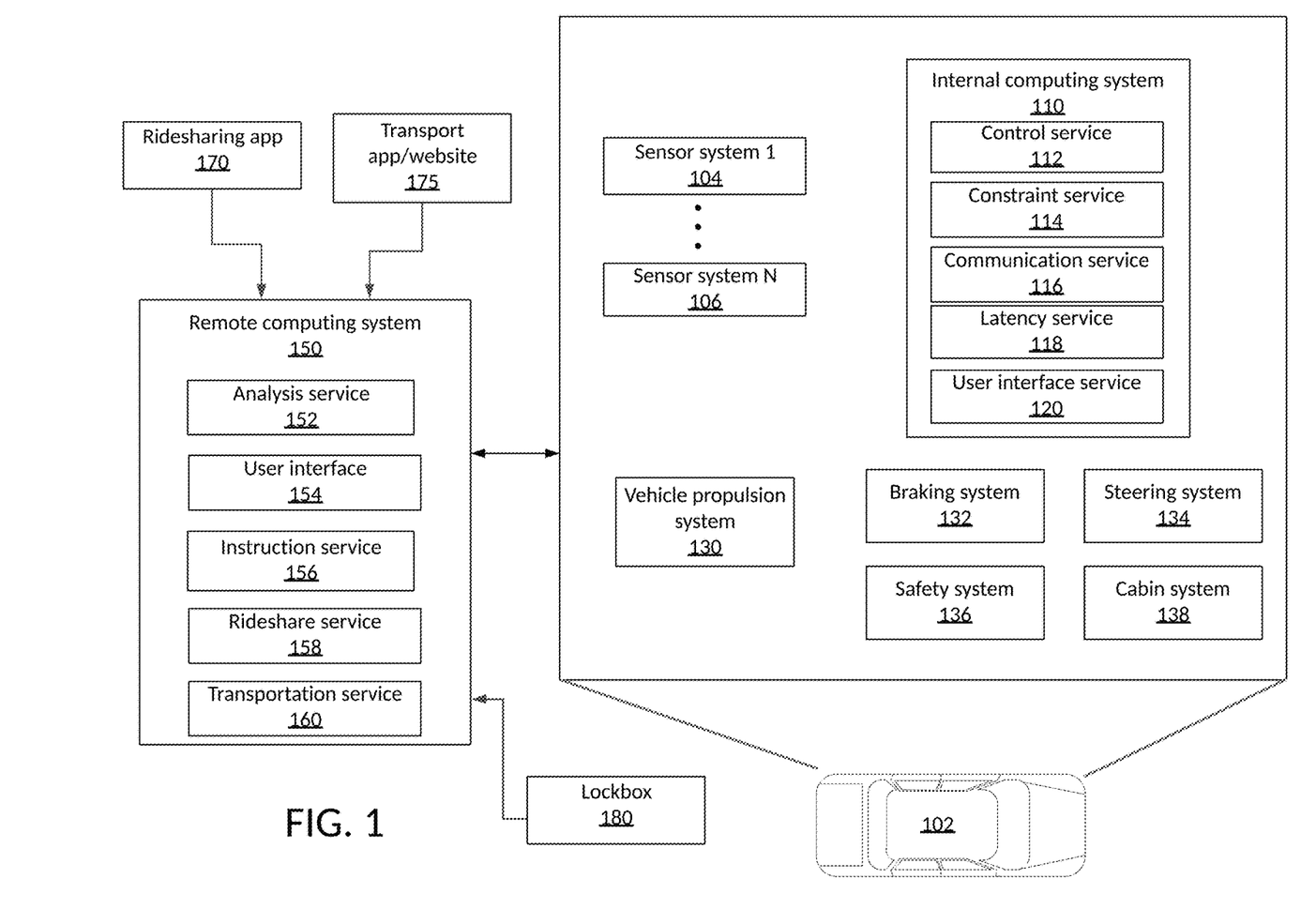
FIG. 1 shows an example embodiment of an autonomous vehicle and a remote computing system in communication with each other in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) internal computing system 110 that is in communication with the sensor systems 104-106 and the systems 130, 132, 134, 136, and 138. The AV internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from the remoting computing system 150 or a human operator via the remote computing system 150, software service updates, ridesharing pick-up and drop-off instructions etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from the remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with the cabin system 138 in order to provide information (or receive information) to a human co-pilot or human passenger. In some embodiments, a human co-pilot or human passenger may be required to evaluate and override a constraint from the constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from the remote computing system 150 or a human operator via the remote computing system 150, software service updates, rideshare pick-up and drop-off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by the autonomous vehicle 102.

The remote computing system 150 can also include a user interface service 154 that is configured to present metrics, video, pictures, sounds reported from the autonomous vehicle 102 to an operator of remote computing system 150. The user interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, the instructions service 156 can prepare instructions to one or more services of the autonomous vehicle 102 or a co-pilot or passenger of the autonomous vehicle 102. Additionally, the instruction service 156 can be responsible for sending route plans for autonomous vehicle 102 to execute such as to complete a rideshare trip or a package delivery.

The remote computing system 150 can also include a rideshare service 158 configured to interact with ridesharing application 170 operating on passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

The remote computing system 150 can also include a transportation service 160 configured to interact with a transportation application/website 175. A user operating transportation application/website 175 can interact with the transportation service 160 to specify information regarding an item to be delivered using the autonomous vehicle 102. In some embodiments the transportation service 160 can include integrations with a peer-to-peer marketplace which can refer item transportation jobs to the transportation service 160.

In some embodiments, the transportation application/website 175 can also be used by users to directly schedule transportation jobs with the transportation service 160. The transportation application/website 175 can receive item dimensions, item weight, a destination address, etc. In some embodiments, a user can request that the autonomous vehicle 102 come to them to pick up the item for transport.

While the transportation application/website 175 has been shown to be separate from the ridesharing application 170, it will be appreciated by those of ordinary skill in the art that the transportation application/website 175 can be integrated with the ridesharing application 170.

In some embodiments, the autonomous vehicle 102 can be utilized for both ridesharing and item delivery. One beneficial aspect of utilizing the autonomous vehicle 102 for both ridesharing and item delivery is increased utilization of the autonomous vehicle 102. The instruction service 156 can continuously keep the autonomous vehicle 102 engaged in a productive itinerary between and during rideshare trips by filling what otherwise would have been idle time with productive item transportation trips.

Figure 2:
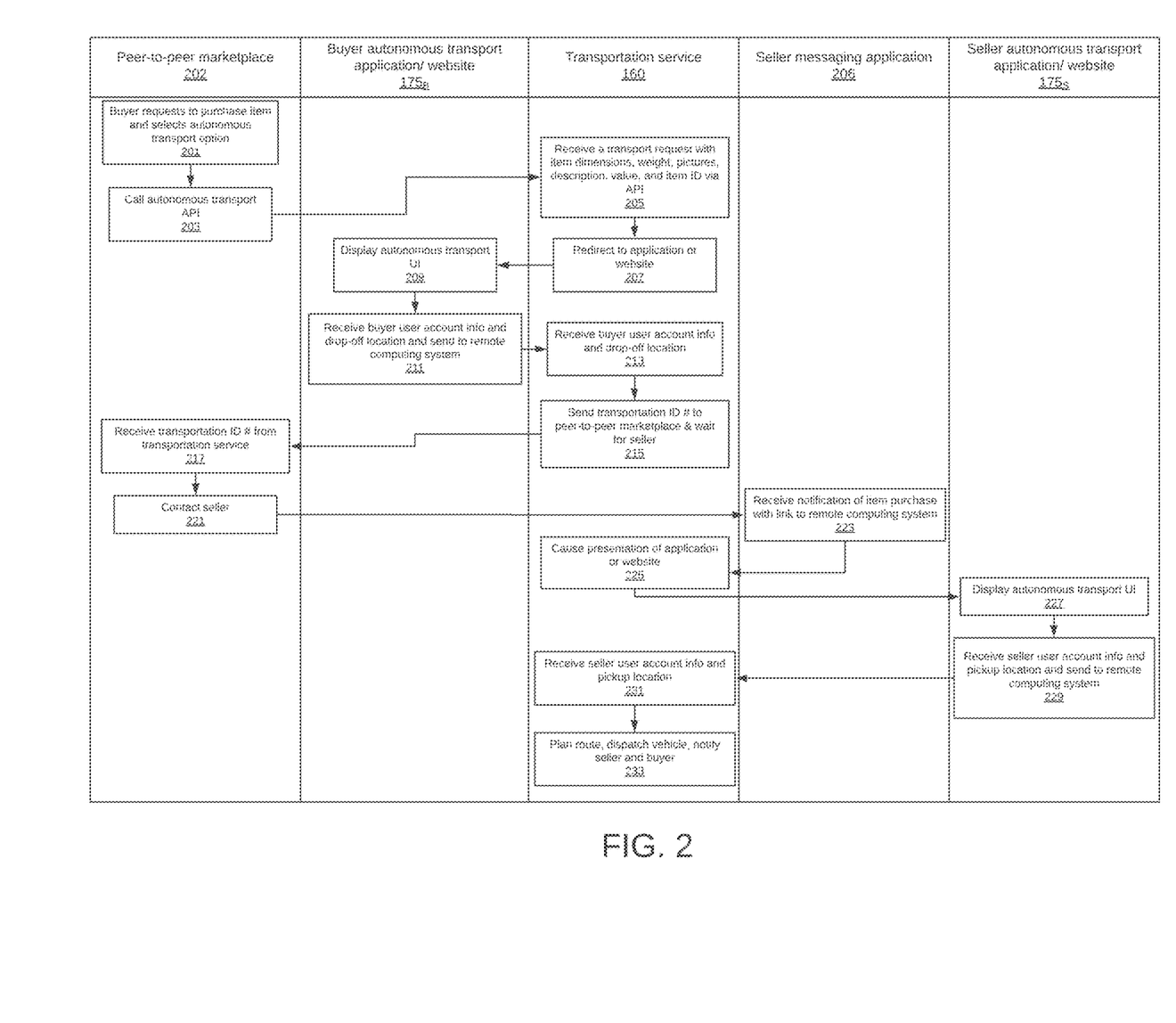
FIG. 2 shows a communication flow for providing autonomous transportation for an item offered for sale on a peer-to-peer marketplace in accordance with some aspects of the present technology.

FIG. 2 shows an example diagram illustrating steps performed by a peer-to-peer marketplace 202, the transportation service 160, a (buyer operated) autonomous transportation application/website $175_B$, a (seller operated) autonomous transportation application/website $175_S$, and a (seller operated) messaging application 206.

As addressed above the peer-to-peer marketplace 202 can be any marketplace for facilitating transactions between two people that are typically not merchants involved in the trade of buying and selling the item that is the focus of the transaction. In the context of the present technology, the peer-to-peer marketplace 202 may be a local peer-to-peer marketplace that focuses on transactions within a given region.

The autonomous transportation applications/websites $175_B$ and $175_S$ are different versions/instances of transportation application/website 175. A buyer can operate a personal computing device to access and log into the transportation application/website $175_B$. A seller can also operate a personal computing device to access and log into the transportation application/website $175_B$. When the transportation application/website 175 is accessed and logged into by the buyer it can be referred to as buyer autonomous transportation application/website $175_B$. When the transportation application/website 175 is accessed and logged into by the seller it can be referred to as the seller autonomous transportation application/website $175_S$.

The seller messaging application 206 can be any application associated with the seller that can receive a message from the peer-to-peer marketplace 202 or the transportation service 160. In some embodiment's the seller messaging application 206 can be a web email service accessed by a computing device, an email application installed on a computing device, a SMS or MMS application on a computing device, a notification service provided by an operating system of a computing device or an application on a computing device, etc.

Figure 5A:
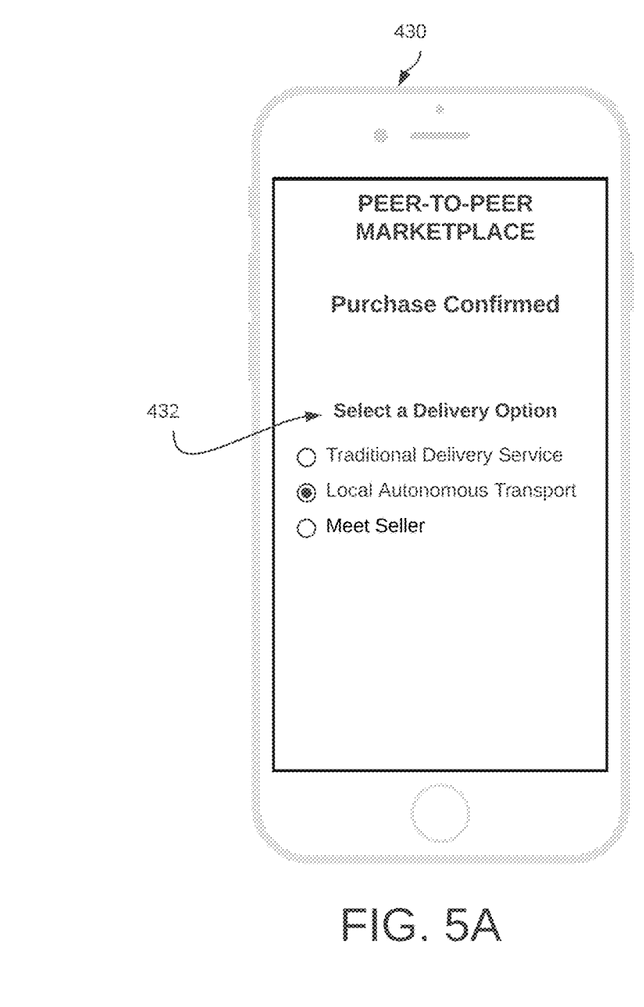
FIG. 5A illustrates an example user interface embodiment presented to a buyer in a peer-to-peer marketplace where the buyer can select an autonomous transportation option in accordance with some aspects of the present technology.

As illustrated in FIG. 2, a buyer can request to purchase an item through peer-to-peer marketplace 202 and can select (201) an autonomous transportation option as a mechanism by which to receive the item (as illustrated in FIG. 5A). In response to the selection (201), the peer-to-peer marketplace 202 can call (203) a transportation service 175 Application Programming Interface ("APP") to set up the autonomous transportation of the item. As part of the API call (203) peer-to-peer marketplace 202 can send and transportation service 160 can receive (205) the transportation request that includes information about the item such as item dimensions, item weight, pictures of the item, a description of the item, value of the item, item, or advertisement ID or transaction ID assigned by the peer-to-peer marketplace 202.

Figure 5B:
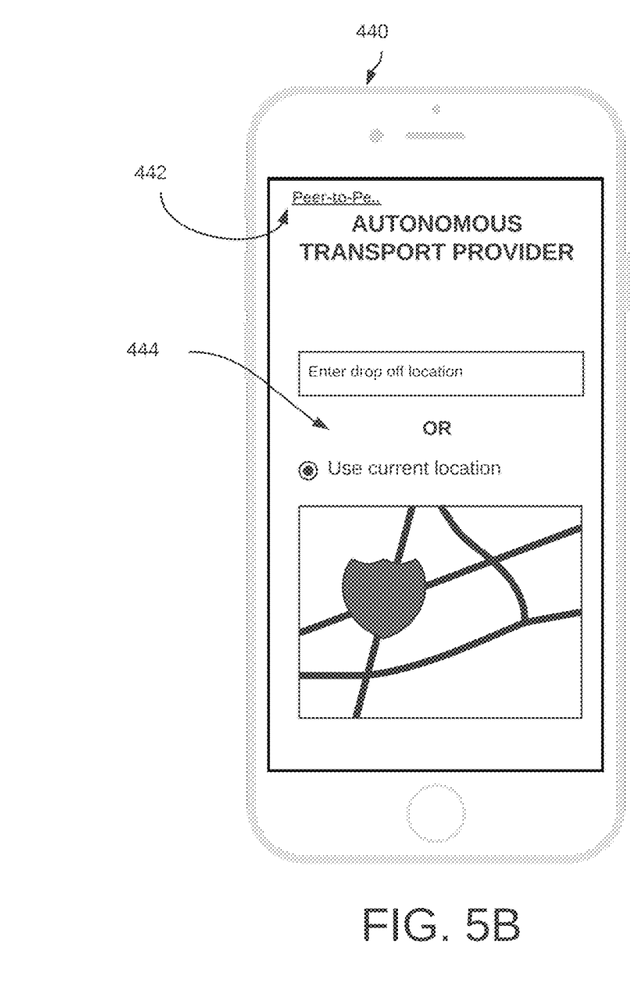
FIG. 5B illustrates an example user interface embodiment presented to a buyer in where the buyer can enter a location to drop off an item selected in the peer-to-peer marketplace in accordance with some aspects of the present technology.

After receiving (205) the transportation request, the transportation service 160 can redirect to the buyer transportation application/website $175_B$. When the buyer is operating a device that includes the autonomous transportation application $175_B$ installed thereon, the redirect can open and thereby display (209) the application on the computing device (as illustrated in FIG. 5B). When the buyer is operating a device that does not include the autonomous transportation application 175 installed thereon, the redirect can open and display (209) the autonomous transportation website $175_B$. The buyer autonomous transportation application/website $175_B$ can prompt the user for and can receive (211) input of the buyer's user account credentials to log into their account with the transportation service 160. Additionally, the buyer autonomous transportation application/website $175_B$ can receive (211) a desired drop-off location for receiving delivery of the item. This information can be received (213) by the transportation service 160.

The buyer is required to have a user account with transportation service 160. If the buyer does not have a user account with transportation service 160, the buyer can establish an account. An account is required so that transportation service 160 and the autonomous vehicle 102 can identify the user when it comes time to deliver the item.

After the transportation service 160 has received (213) the buyer user account information and drop-off location for the item, the transportation service 160 can send (215) a transportation ID number or a link to the peer-to-peer marketplace 202.

The transportation service 160 does not do anything further at this time as it currently does not know where to meet the seller to pick up item.

Meanwhile the peer-to-peer marketplace 202 can receive (217) the transportation ID number or the link from the transportation service 160. The peer-to-peer marketplace 202 can contact the seller (221) by sending a notification to the seller that is received (223) by the seller messaging application 206 that includes instructions to contact the transportation service 160 to schedule pickup of the item. The notification can include the transportation ID or the link received from the transportation service 160 so that the transportation service 160 can identify the seller as being related to the specific transaction.

The seller can view the notification in the seller messaging application 206 and click on a link to access the transportation service 160 which can then cause the seller autonomous transportation application/website $175_S$ to be presented. The seller autonomous transportation application/website $175_S$ can display (227) the user interface such as that illustrated in FIG. 4B that can receive (229) user inputs specifying the seller's user account information and pick-up location. This information can be sent (229) to the transportation service 160 which can receive (231) the seller user account information and pick-up location.

Now having both the seller's pick-up location and the buyers drop-off location, the transportation service can plan (233) a route and dispatch the vehicle and notify the buyer and seller that the autonomous vehicle is on the way.

Figure 3:
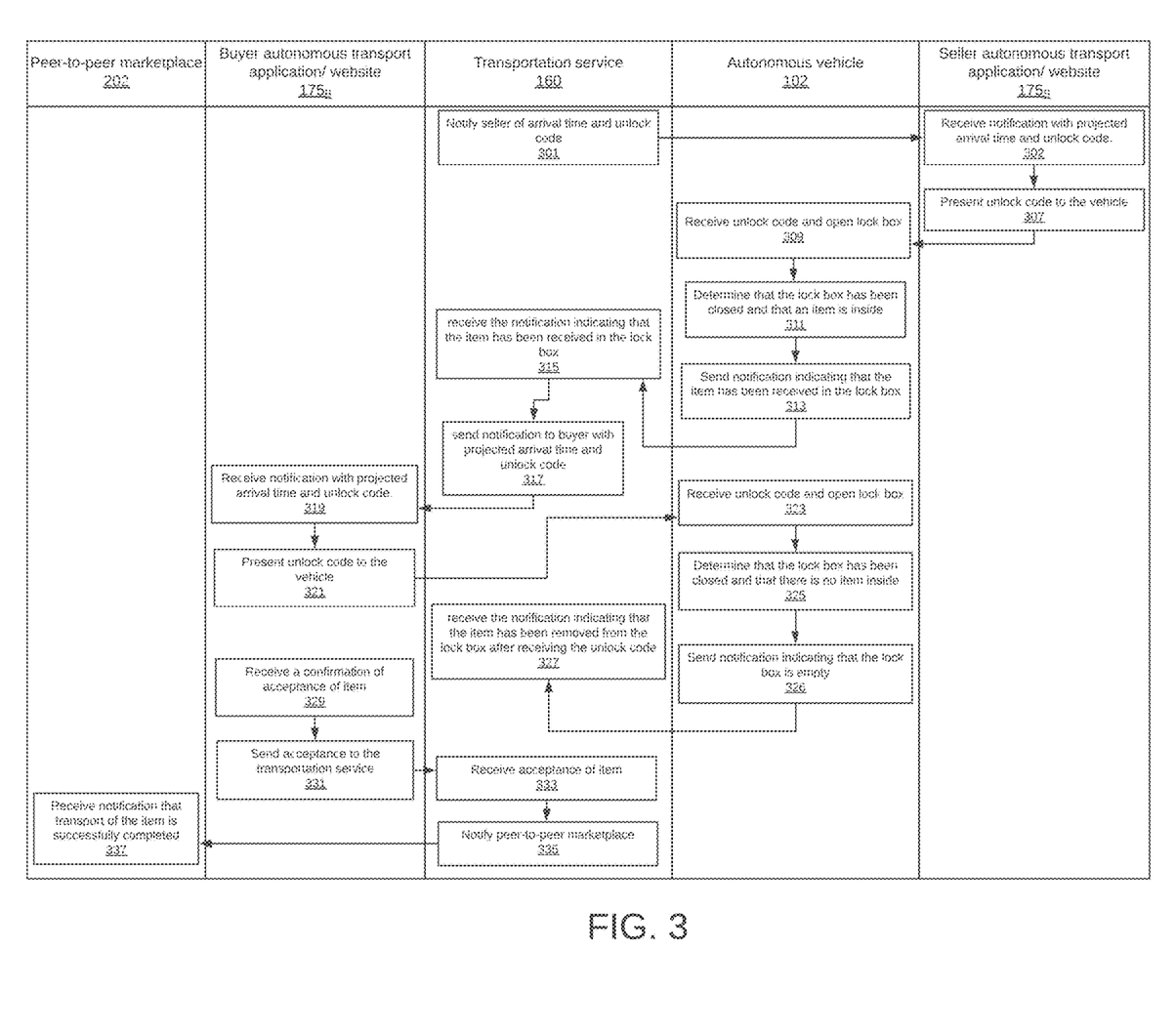
FIG. 3 shows a communication flow for providing autonomous transportation for an item offered for sale on a peer-to-peer marketplace in accordance with some aspects of the present technology.

While FIG. 3 has been explained such that the transportation service 160 will route the autonomous vehicle 102 directly from the seller to the buyer, this is not necessary. In some embodiments, the transportation service 160 can arrange for the item to be picked up from seller at a time that is convenient for the seller and that works for other itineraries of an autonomous vehicle 102, and the autonomous vehicle 102 can transport the item on other trips throughout the day. The transportation service 160 can separately arrange for a time to drop off the item with the seller. Likewise, the transportation service 160 can pick up the item from the seller without yet knowing the location of the buyer. Since, in some embodiments, the item does not need to be immediately dropped off with the buyer, the transportation of the item can be at a low effective cost to the transportation service 160 if the autonomous vehicle 102 is kept busy on other itineraries that naturally route the autonomous vehicle 102 in the direction of the drop off location.

FIG. 3 illustrates a diagram illustrating commute communications between peer-to-peer marketplace 202, the buyer autonomous transportation application/website $175_B$, the transportation service 160, the autonomous vehicle 102, and the seller autonomous transportation application/website $175_S$.

As illustrated in FIG. 3, the transportation service 160 can send a notification to notify (301) the seller of the arrival time of the autonomous vehicle 102 and also send an unlock code so that the seller can unlock the autonomous vehicle 102 and a lockbox 180 within the autonomous vehicle 102. The seller can receive (302) the notification via the seller autonomous transportation application/website $175_S$.

The seller can present (307) the unlock code to the vehicle via a communication from the seller's autonomous transportation application/website $175_S$ which can be received (309) by the autonomous vehicle 102.

In some embodiments, the seller autonomous transportation application/website $175_S$ can communicate directly with the autonomous vehicle 102, however in other embodiments it may be more preferred to prevent direct communications between the seller autonomous transportation application/website $175_S$ and the autonomous vehicle 102. In such embodiments, the seller autonomous transportation application/website $175_S$ can communicate with remote computing system 150 which in turn can communicate with the autonomous vehicle 102. In such embodiments, it is not necessary for the autonomous vehicle 102 to actually receive the unlock code. Instead, the remote computing system 150 can verify the code and provide an instruction to the autonomous vehicle 102 to open its doors and/or lockbox 180.

In some embodiments a mechanism to unlock the car doors and to unlock the lockbox 180 can be separate. In such embodiments, the seller can be informed with specific instructions on how to unlock the lockbox 180. It may be possible for the seller autonomous transportation application/website $175_S$ to communicate directly with the lockbox 180. In such embodiments as when the seller autonomous transportation application/website $175_S$ communicates directly with the lockbox 180, the lockbox 180 might have a separate communications channel to the transportation service 160 that avoids direct communications between the lockbox 180 and the autonomous vehicle 102. The seller autonomous transportation application/website $175_S$ can communicate with the lockbox 180 to unlock the lockbox 180, and the lockbox 180 can communicate with the transportation service 160 to inform the transportation service of the code, or user that unlocked the lockbox 180.

Whether the autonomous vehicle 102 receives (309) the unlock code from the seller autonomous transportation application/website $175_S$ or received an instruction from remote computing system 150, the autonomous vehicle can unlock its doors and open (309) the lockbox 180.

In addition to the fact that the user has presented the unlock code to the autonomous vehicle 102 (or to the remote computing system 150), the autonomous vehicle 102 and the remote computing system 150 can further be confident that it is the seller interacting with the autonomous vehicle 102 because the autonomous vehicle can record pictures and video of the seller. In some embodiments, the autonomous vehicle 102 may include facial recognition technology to further increase the confidence that the right person is interacting with the autonomous vehicle 102.

The autonomous vehicle 102 can determine (311) that the lockbox 180 has been closed and that an item is inside. The lockbox 180 can be outfitted with a switch to be able to detect when it is open or closed. Additionally, the lockbox 180 can also include a weight sensor or a camera or both in order to verify that the lockbox 180 contains an item. The autonomous vehicle 102 can then send (313) a notification to the transportation service 160 indicating that the item has been received in the lockbox 180.

In some embodiments, the seller can also notify the transportation service 160 that the item has been received in a lockbox 180 using the seller's autonomous transportation application/website $175_S$.

The transportation service 160 can receive (315) the notification indicating that the item has been received in the lockbox 180. Thereafter, the transportation service 160 can send (317) a notification to the buyer with a projected arrival time and an unlock code. The buyer can receive (319) the notification using the buyer's autonomous transportation application/website $175_B$.

After the autonomous vehicle 102 arrives at the drop-off location, the buyer can operate the autonomous transportation application/website $175_B$ to present (321) the unlock code to the vehicle. As above, in the case of the seller, in some embodiments, the unlock code may be presented to the remote computing system 150 which can confirm that the code is correct and can send further instructions to the autonomous vehicle 102. In some embodiments the unlock code can be presented directly to the lockbox 180, which can communicate directly with the transportation service 160. Whether it is the remote computing system 150, the autonomous vehicle 102, or the lockbox 180 that receives the unlock code, the autonomous vehicle (or the lockbox 180 independently) can open (323) the lockbox 180.

After the buyer has removed the item and is ready to accept delivery of the item the buyer can close the lockbox 180. The autonomous vehicle 102 can determine (325) that the lockbox 180 has been closed and there is no item inside.

The autonomous vehicle 102 can send (326) a notification to the transportation service 160 indicating that the lockbox 180 is empty. The transportation service 160 can receive (327) the notification indicating that the item has been removed from the lockbox 180.

In some embodiments the buyer's autonomous transportation application/website $175_B$ might also present a user interface triggered by the arrival of the autonomous vehicle 102 and the presentation (321) of the unlock code that allows user to indicate an acceptance of the item. The buyer's autonomous transportation application/website $175_B$ can receive (329) user input indicating confirmation of acceptance and can send (331) the acceptance to the transportation service 160. The confirmation of acceptance can also be an instruction that the autonomous vehicle 102 can be dismissed and it can proceed along another itinerary.

The transportation service 160 can receive (333) the acceptance of the item and can notify (335) the peer-to-peer marketplace 202. The peer-to-peer marketplace 202 can then receive (337) the notification that the transportation of the item was successfully completed.

Figure 4A:
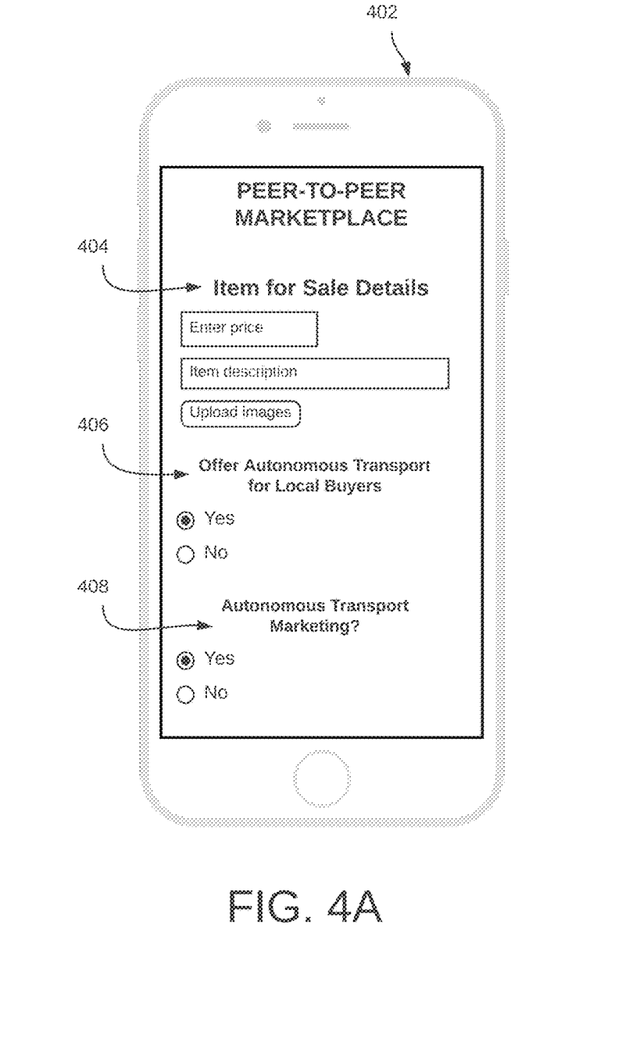
FIG. 4A illustrates an example user interface embodiment for posting a item for sale in a peer-to-peer marketplace that offers autonomous transportation of the item in accordance with some aspects of the present technology.
Figure 4B:
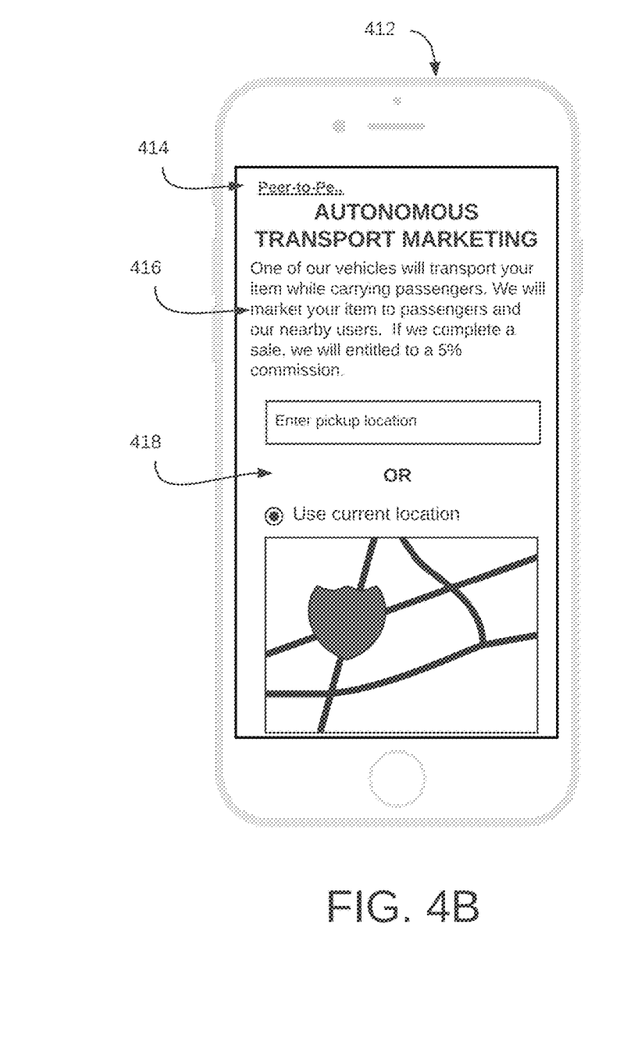
FIG. 4B illustrates an example user interface embodiment for setting up autonomous transportation marketing for the item for sale in a peer-to-peer marketplace in accordance with some aspects of the present technology.

FIG. 4A and FIG. 4B illustrate example user interfaces that may be presented to a seller by the peer-to-peer marketplace 202. FIG. 4A shows user interface 402 for setting up an advertisement for the item which requests item for sale details 404 including details such as price and item description and images of the item for sale. User interface 402 offers an option 406 for whether the user wants to make the item for sale available for delivery via autonomous transportation. In some embodiments, autonomous transportation may only be available for local buyers. A local buyer is a buyer that is located within a service area of an autonomous vehicle associated with the transportation service 160.

In some embodiments user interface 402 can also provide an option for autonomous transportation marketing 408. Autonomous transportation marketing can be used prior to a buyer indicating their desire to purchase the item. If the seller chooses the option for autonomous transportation marketing, the buyer can be presented with user interface 412 shown in FIG. 4B.

User interface 412 is an interface provided by the seller's autonomous transportation application/website $175_S$ that offers autonomous transportation marketing. User interface 412 can be displayed as a result of a selection of option 408 in user interface 402. As such, user interface 412 can show a breadcrumb 414 showing that the user was directed to user interface 412 from a user interface 402 provided by the peer-to-peer marketplace 202. The user interface 412 also explains the concept of autonomous transportation marketing. In autonomous transportation marketing an autonomous vehicle 102 provided by the transportation service 160 can collect the item from the seller and will transport the item in a lockbox 180 within the autonomous vehicle 102 while the autonomous vehicle 102 proceeds on other itineraries. For example, as the autonomous vehicle transports passengers coordinated through the rideshare service 158, the autonomous vehicle 102 will advertise the item contained in its lockbox 180 to its passengers. In some embodiments, the transportation service 160 can also send advertising notifications to user accounts associated with the transportation service 160 or rideshare service 158 that are at locations along a route for which the autonomous vehicle 102 will pass.

The autonomous vehicle 102 may let passengers (or those receiving marketing messages) open the lockbox 180 to view the item so that they can decide whether to purchase item. Any user that has a user account with the rideshare service 158 or transportation service 160 can open the lockbox 180 by requesting to open the lockbox 180 via their ridesharing application 170 or their transportation application 175. In this way, the remote computing system 150 can be aware of the user account that has opened the lockbox 180. If item is not returned to the lockbox 180, the transportation service 160 can conclude that the user associated with the user account that opened the item has decided to purchase the item for a listed price and can charge the user account.

User interface 412 also provides form 418 for which the user can input the location so that the autonomous vehicle 102 can pick up the item to perform the autonomous transportation marketing.

FIG. 5A illustrates user interface 430 provided by the peer-to-peer marketplace after a buyer has requested to purchase the item. User interface 430 can select a delivery option 432 including the option for local autonomous transportation. When the user selects the option 432 for local autonomous transportation, the user can be directed to user interface 440 in FIG. 5B. The user interface 440 is presented by the buyer autonomous transportation application $175_B$ and provides a breadcrumb 442 back to user interface 430 provided by the peer-to-peer marketplace. User interface 440 also provides form 444 where the buyer can enter their drop-off location or use their current location as the drop-off location.

Figure 6A:
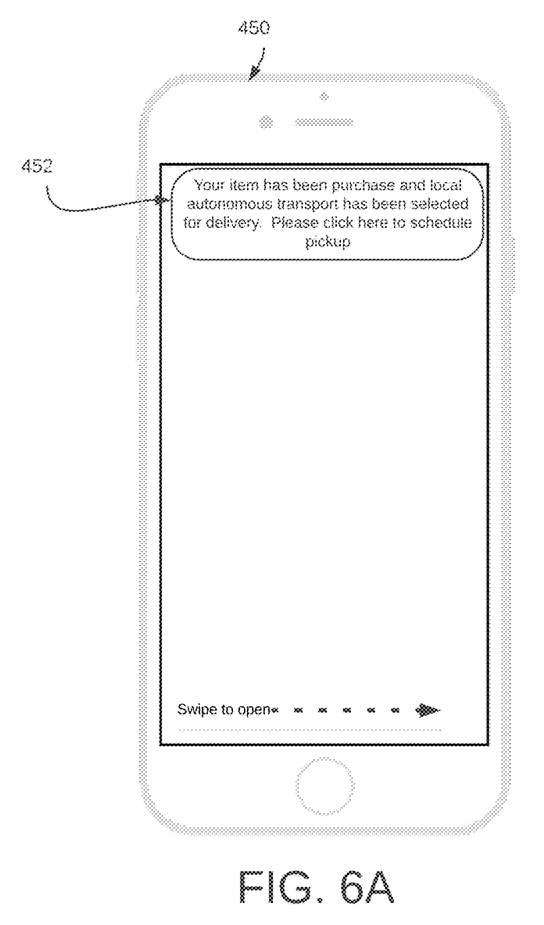
FIG. 6A illustrates an example user interface embodiment showing a notification to a seller that a buyer has selected the item for sale to be transported using autonomous transportation in accordance with some aspects of the present technology.
Figure 6B:
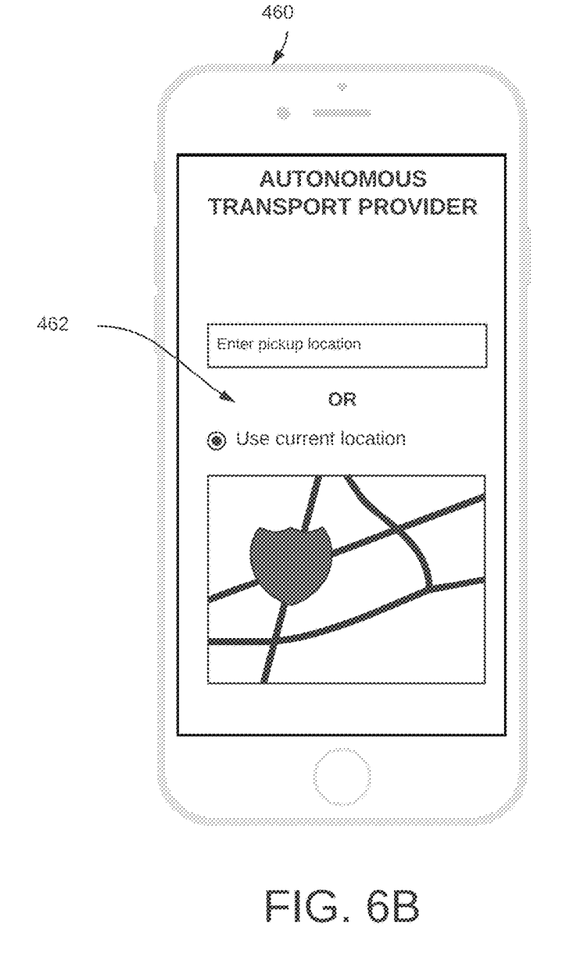
FIG. 6B illustrates an example user interface embodiment presented to a seller in which the seller can enter a location to pick-up location for an item selected in the peer-to-peer marketplace in accordance with some aspects of the present technology.

FIG. 6A illustrates user interface 450 showing a notification 452 that can be presented on a seller's computing device. Notification 452 informs the seller that a buyer is interested in their item and that the buyer has selected local autonomous transportation for delivery. When the seller clicks on the notification, they can be directed to user interface 460 illustrated in FIG. 6B. User interface 460 allows the seller to enter a location in which the autonomous vehicle 102 can come to pick up the item.

Payment for the item for sale can be handled in several different ways. Some peer-to-peer marketplaces don't accept payments or complete transactions on behalf of the seller, though it is technologically possible for them to do so when the advertisements are posted on the Internet. In such embodiments, the transportation service 160 can handle the financial part of the transaction as the transportation service 160 already has a payment account linked to the buyer and seller user accounts.

Transactions in a peer-to-peer marketplace are often characterized by some amount of negotiating. If a buyer wishes to negotiate, the transportation service 160 can also facilitate such negotiation by permitting the seller and buyer to message each other through the transportation application/website 175. In some embodiments, the transportation application/website 175 can utilize artificial intelligence tools to monitor the communications to recognize when a price is agreed upon to more easily facilitate a payment flow. In some embodiments, the seller and buyer might wish to talk by phone, and the transportation application/website 175 can connect the parties over a public switched telephone network (PSTN) or a voice over IP (VoIP) network. Any such messaging or voice connection can still keep the parties anonymous by not reveling user names, telephone numbers, or locations.

Once a negotiation is complete, the seller, buyer, or the transportation service 160 can post the new price to the parties to complete the transaction.

In embodiments, wherein the peer-to-peer marketplace 202 offers a payment function, the parties can be transferred back to peer-to-peer marketplace 202 to handle payment.

In some embodiments, the same autonomous vehicle 102 that is being used to transport an item can simultaneously be used to transport a passenger. In such embodiments, the ride share service 158 and the transportation service 160 can coordinate to match jobs for the autonomous vehicle 102. For example, if an autonomous vehicle 102 is already carrying a passenger on a route that will pass by the pick-up location or drop-off location of the item, the remote computing system 150 can instruct the autonomous vehicle 102 to make a stop to pick up the item. In some embodiments, the ride share service 158 may offer a discount to a passenger.

In some embodiments, coordination between the ride share service 158 and the transportation service 160 can permit an existing rideshare itinerary to be interrupted to pick up the item from a seller, but may not permit an existing rideshare itinerary to be interrupted to drop off the item to a buyer. This is because the buyer may take a period of time to inspect the item and or to negotiate with the seller and this may be too great of an inconvenience to the rideshare passenger.

The lockbox can be integrated into the autonomous vehicle 102 in a number of ways. In some embodiments, the lock box is integrated into the autonomous vehicle 102 by replacing a conventional seat or conventional console or storage compartment. In this way the lockbox can be physically secured to the car in the passenger cabin. In some embodiments the lockbox can be integrated into a front or rear trunk of the autonomous vehicle 102. This arrangement has the advantage that a ride share passenger would not need to be disturbed when a user was accessing the lockbox.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In some embodiments the autonomous transportation service 160 can be used without peer-to-peer marketplace 202. One or more users could utilize transportation application/website 175 to select drop-off and pick-up locations for an item to be transported.

In some embodiments, the transportation service 160 can provide its own peer-to-peer marketplace or it can integrate with a third-party peer-to-peer marketplace.

Figure 7:
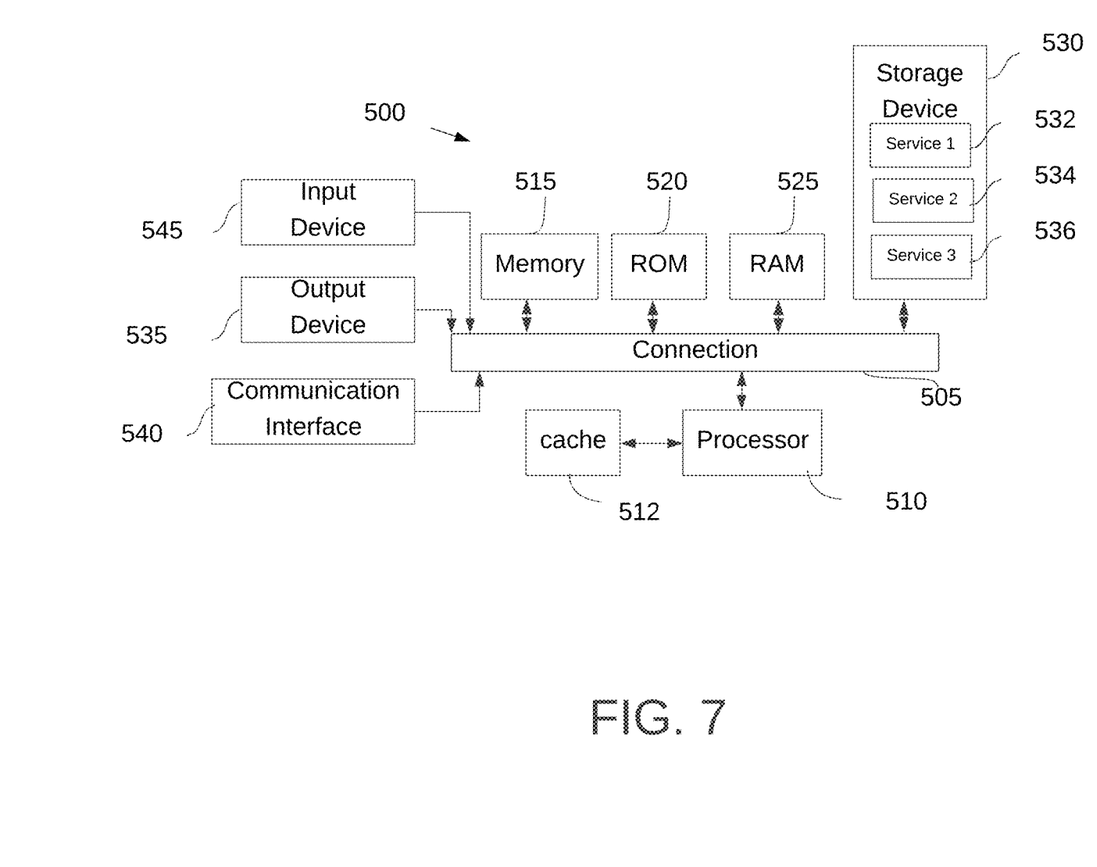
FIG. 7 shows an example embodiment of a system for implementing certain aspects of the present technology.

FIG. 7 shows an example of computing system 500, which can be for example any computing device making up internal computing system 110, remote computing system 150, a device executing rideshare app 170 or transportation application/website, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions, the instructions, when executed by a transportation service computing system, cause the transportation service computing system to:

receive a first transportation request for autonomous transportation of an item from a marketplace by the transportation service computing system that schedules an autonomous vehicle for passenger ridesharing and goods transportation;

provide a user interface for presentation of an advertisement of the item on a user device, wherein the advertisement includes item information about the item;

send notifications marketing the item to rideshare passengers;

direct a user device of a user using the marketplace and requesting the autonomous transportation to a user interface to provide details pertaining to the autonomous transportation;

receive a communication indicating that the item has been received in a lockbox inside the autonomous vehicle;

receive, from a second user, a selection to view the item so the second user can decide whether to purchase item;

receive an instruction from the user device by the transportation service computing system to unlock the autonomous vehicle;

relay the instruction to unlock the autonomous vehicle to the autonomous vehicle;

receive a second instruction from the user device by a separate transportation services computing system to unlock the lockbox inside the autonomous vehicle;

send, by the separate transportation services computing system a communication including the instruction to unlock the lockbox to a controller of the lockbox, wherein the lockbox unlocks the lockbox in accordance with the instruction;

receive a communication indicating that the item has been retrieved from the lockbox inside the autonomous vehicle;

determine that the item was not returned to the lockbox;

determine, based on the item not being returned to the lockbox, that the second user has decided to purchase the item for a listed price and charge a user account associated with the second user;

send a notification to the marketplace that the item has been delivered; and send an instruction to the autonomous vehicle indicating the acceptance of a buyer and that the autonomous vehicle can depart from a dropoff location.

2. The non-transitory computer readable medium of claim 1 wherein the user interface to provide details pertaining to the autonomous transportation is configured to be presented to a buyer, and to receive a user ID for the buyer for an autonomous transportation service, and to receive a drop-off location for the item.

3. The non-transitory computer readable medium of claim 1 wherein the communication indicating that the item has been received in the lockbox is a communication from the autonomous vehicle indicating that the lockbox is locked and that at least one sensor of the lockbox detects a presence of the item within the lockbox.

4. The non-transitory computer readable medium of claim 1 wherein the user interface to provide details pertaining to the autonomous transportation is configured to be presented to a seller, and to receive a user ID for the seller for an autonomous transportation service, and to receive a pick-up location for the item.

5. The non-transitory computer readable medium of claim 1 wherein the instructions cause the computing system to:
provide a user interface for presentation of an advertisement of the item on a user device of a seller while the autonomous vehicle transports the item, wherein the advertisement includes item information about the item;
send notifications marketing the item to rideshare passengers of the autonomous vehicle;
receive a selection of the item from an occupant of a second autonomous vehicle; and
schedule a transfer of the item from the autonomous vehicle transporting the item and the second autonomous vehicle.

6. The non-transitory computer readable medium of claim 1 wherein the transportation request is received via an Application Programming Interface ("API") provided by a transportation service, the API specifying fields for item dimensions, weight, pictures, description, value, and item ID.

7. A method comprising:
receiving a first transportation request for autonomous transportation of an item from a peer-to-peer marketplace by a transportation service that schedules an autonomous vehicle for passenger ridesharing and goods transportation;
providing a user interface for presentation of an advertisement of the item on a user device, wherein the advertisement includes item information about the item;
sending notifications marketing the item to rideshare passengers;
directing a user device of a user using the marketplace and requesting the autonomous transportation to an user interface to provide details pertaining to the autonomous transportation;
receiving a communication indicating that the item has been received in a lockbox inside the autonomous vehicle;
receiving, from a second user, a selection to view the item so the second user can decide whether to purchase item;
receiving an instruction from the user device by a transportation service computing system to unlock the autonomous vehicle;
relaying the instruction to unlock the autonomous vehicle to the autonomous vehicle;
receiving a second instruction from the user device by a separate transportation services computing system to unlock the lockbox inside the autonomous vehicle;
sending, by the separate transportation services computing system, a communication including the instruction to unlock the lockbox to a controller of the lockbox, wherein the lockbox unlocks the lockbox in accordance with the instruction;
receiving a communication indicating that the item has been retrieved from the lockbox inside the autonomous vehicle;
determining that the item was not returned to the lockbox;
determining, based on the item not being returned to the lockbox, that the second user has decided to purchase the item for a listed price and charge a user account associated with the second user;
sending a notification to the marketplace that the item has been delivered; and
sending an instruction to the autonomous vehicle indicating the acceptance of a buyer and that the autonomous vehicle can depart from a dropoff location.

8. The method of claim 7, wherein the user interface to provide details pertaining to the autonomous transportation is configured to be presented to a buyer, and to receive a user ID for the buyer for an autonomous transportation service, and to receive a drop-off location for the item.

9. The method of claim 7 wherein the communication indicating that the item has been retrieved from the lockbox is a communication from the autonomous vehicle indicating that at least one sensor of the lockbox detects that the lockbox is empty.

10. The method of claim 7 wherein the user interface to provide details pertaining to the autonomous transportation is configured to be presented to a seller, and to receive a user ID for the seller for an autonomous transportation service, and to receive a pick-up location for the item.

11. The method of claim 7 comprising:
providing a user interface for presentation of an advertisement of the item on a user device of a seller while the autonomous vehicle transports the item, wherein the advertisement includes item information about the item;
sending notifications advertising the item to rideshare passengers of the autonomous vehicle;
receiving a selection of the item from an occupant of a second autonomous vehicle; and
scheduling a transfer of the item from the autonomous vehicle transporting the item and the second autonomous vehicle.

12. The method of claim 7 wherein the transportation request is received via an API provided by a transportation service, an Application Programming Interface ("API") specifying fields for item dimensions, weight, pictures, description, value, and item ID.

13. The method of claim 8 wherein the providing the user interface comprises initiating a redirect flow causing the marketplace to request interfaces from an Internet address or from a local autonomous transportation application, the method comprising:
after the autonomous transportation application has received the user ID for the buyer and a drop-off location for the item, returning the user to a user interface of the peer-to-peer marketplace.

14. A transportation service system comprising:
at least one non-transitory computer readable medium comprising instructions; and
at least one processor, the instructions, when executed, cause the at least one processor to:
receive a first transportation request for autonomous transportation of an item from a marketplace by the transportation service computing system that schedules an autonomous vehicle for passenger ridesharing and goods transportation;

provide a user interface for presentation of an advertisement of the item on a user device, wherein the advertisement includes item information about the item;

send notifications marketing the item to rideshare passengers;

direct a user device of a user using the marketplace and requesting the autonomous transportation to an user interface to provide details pertaining to the autonomous transportation;

receive a communication indicating that the item has been received in a lockbox inside the autonomous vehicle;

receive, from a second user, a selection to view the item so the second user can decide whether to purchase item;

receive an instruction from the user device by the transportation service computing system to unlock the autonomous vehicle;

relay the instruction to unlock the autonomous vehicle to the autonomous vehicle;

receive a second instruction from the user device by a separate transportation services computing system to unlock the lockbox inside the autonomous vehicle;

send, by the separate transportation services computing system a communication including the instruction to unlock the lockbox to a controller of the lockbox, wherein the lockbox unlocks the lockbox in accordance with the instruction;

receive a communication indicating that the item has been retrieved from the lockbox inside the autonomous vehicle;

determine that the item was not returned to the lockbox;

determine, based on the item not being returned to the lockbox, that the second user has decided to purchase the item for a listed price and charge a user account associated with the second user;

send a notification to the marketplace that the item has been delivered; and sending an instruction to the autonomous vehicle indicating the acceptance of a buyer and that the autonomous vehicle can depart from a dropoff location.

15. The system of claim 14 wherein the communication indicating that the item has been retrieved from the lockbox is a communication from the autonomous vehicle indicating that at least one sensor of the lockbox detects the that the lockbox is empty.

16. The system of claim 14 wherein the instructions cause the computing system to:

provide a user interface for presentation of an advertisement of the item on a user device of a seller while the autonomous vehicle transports the item, wherein the advertisement includes item information about the item;

send notifications advertising the item to rideshare passengers of the autonomous vehicle;

receiving a selection of the item from an occupant of a second autonomous vehicle; and scheduling a transfer of the item from the autonomous vehicle transporting the item and the second autonomous vehicle.

17. The method of claim 7 comprising:

providing a communication interface to connect a buyer and a seller to negotiate a final price for a sale of the item.

18. The method of claim 7, wherein the marketplace is a third-party with respect to the transportation service computing system.

19. The non-transitory computer readable medium of claim 1 wherein the instructions cause the computing system to:

receive a plurality of additional transportation requests for autonomous transportation of additional items and one or more passengers while transporting the item, wherein the transportation service computing system schedules the plurality of additional transportation requests based on a first delivery route of the item to a dropoff location in accordance with a predetermined drop off time of the item.

20. The non-transitory computer readable medium of claim 1 wherein the instructions cause the computing system to:

receive one or more images from the autonomous vehicle and inside the lockbox to verify an authorized interaction to unlock the autonomous vehicle and retrieval of an item from the lockbox.

* * * * *